(12) United States Patent
Lee et al.

(10) Patent No.: US 8,151,350 B2
(45) Date of Patent: Apr. 3, 2012

(54) METHOD AND DEVICE FOR DETECTING UNKNOWN NETWORK WORMS

(75) Inventors: Hee-Jo Lee, Namyangju (KR);
Hyun-Do Park, Goyang (KR)

(73) Assignee: Korea University Industry and Academy Collaboration Foundation, Seoul (KR)

( * ) Notice: Subject to any disclaimer, the term of this patent is extended or adjusted under 35 U.S.C. 154(b) by 519 days.

(21) Appl. No.: 12/388,170

(22) Filed: Feb. 18, 2009

(65) Prior Publication Data
US 2010/0115618 A1    May 6, 2010

(30) Foreign Application Priority Data

Nov. 3, 2008  (KR) .......................... 10-2008-0108252
Feb. 18, 2009  (KR) .......................... 10-2009-0013412

(51) Int. Cl.
*H04L 29/06* (2006.01)
(52) U.S. Cl. .......................................................... 726/22
(58) Field of Classification Search ........................ None
See application file for complete search history.

(56) References Cited

U.S. PATENT DOCUMENTS 7,363,386 B1 *   4/2008   Nucci et al. .................... 709/241
7,864,751 B2 *   1/2011   Greenberg ..................... 370/351

FOREIGN PATENT DOCUMENTS

KR     1020070050726          5/2007
KR      100745613  B1 *       7/2007

OTHER PUBLICATIONS

Hyundo Park and Heejo Lee, Apr. 2007 Detecting Unknown Worm using Randomness Check, Pretainent pp. 894-902.*
Hyundo Park, et al., "Anomaly Detection System of Worm Using Randomness Check", Dept. of Computer Science and Engineering, Korea University, 2005. vol. 32. No. 1 (A).

* cited by examiner

*Primary Examiner* — Jung Kim
*Assistant Examiner* — Ghodrat Jamshidi
(74) *Attorney, Agent, or Firm* — Gifford, Krass, Sprinkle, Anderson & Citkowski, P.C.

(57) ABSTRACT

A method and device for detecting a network worm on the network allows early detection of an unknown network worm with less computational quantity based on a change of randomness occurring to network traffic without using a pattern-matching-based worm detecting method or a behavior-based worm detecting method.

16 Claims, 11 Drawing Sheets

METHOD AND DEVICE FOR DETECTING UNKNOWN NETWORK WORMS

CROSS-REFERENCE TO RELATED APPLICATIONS

This application claims priority to and the benefit of Korean Patent Application No. 10-2008-0108352 filed in the Korean Intellectual Property Office on Nov. 3, 2008, and Korean Patent Application No. 10-2009-0013412 filed in the Korean Intellectual Property Office on Feb. 18, 2009, the entire contents of which are incorporated herein by reference.

BACKGROUND OF THE INVENTION

1. Field of the Invention

The present invention relates to a method for detecting network worms on a network. More particularly, the present invention relates to a worm detecting method and device for early detection of unknown network worms with less computational quantity.

2. Description of the Related Art

There are many tools for detecting worms on a network, such as vaccine programs, IDS, IPS, or firewalls.

However, they are insufficient in detecting worms by using less computational quantity and a small memory space on a huge network. Most security techniques for detecting worms and processing the detected worms require a large amount of computational quantity and memory space.

The conventional worm detecting methods are classified as a pattern-matching-based worm detecting method and a worm-behavior-based worm detecting method. Their drawbacks are as follows.

First, the worm detecting schemes through pattern matching fail to detect unknown worms.

Next, the schemes for detecting worms based on the worm behavior have many false positives, and they require a large computational quantity for detection because many pieces of network information are to be used so as to detect the worms.

One of the behavior-based worm detecting schemes is to use network entropy, which however requires a large computational quantity and is difficult to be applicable to a large capacity and high speed network, for example a backbone network.

Accordingly, the current worm detecting schemes fail to efficiently detect unknown worms from a huge network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a worm detecting method and device for detecting unknown network worms of a huge network in an earlier stage and with less computational quantity.

An exemplary embodiment of the present invention provides a worm detecting method including: collecting traffic provided to a network to thus collect passing traffic; generating a first traffic matrix for showing a characteristic of the traffic in a first time domain beginning at the first time, a second traffic matrix for showing a characteristic of the traffic in a second time domain beginning at a second time that is an end time of the first time domain, and a third traffic matrix for showing a characteristic of the traffic in a third time domain beginning at a third time that is an end time of the second time domain to thus generate a traffic matrix; eliminating a matrix entry corresponding to a legitimate flow in the first time domain, the second time domain and the third time domain, and eliminating a matrix entry corresponding to the flow having ended or started at the exact time of the second time and the flow having ended at the third time from the legitimate flow, and generating a legitimate traffic elimination matrix to thus eliminate legitimate traffic; calculating a rank value of the legitimate traffic elimination matrix to thus calculate a rank value; and determining the network state based on the rank value to thus determine a state of the network.

Another embodiment of the present invention provides a worm detecting device including: a traffic collector for collecting traffic provided to a network; a traffic matrix generator for generating a first traffic matrix for showing a characteristic of the traffic in a first time domain beginning at the first time, a second traffic matrix for showing a characteristic of the traffic in a second time domain beginning at a second time that is an end time of the first time domain, and a third traffic matrix for showing a characteristic of the traffic in a third time domain beginning at a third time that is an end time of the second time domain; a legitimate traffic eliminator for eliminating a matrix entry corresponding to a legitimate flow in the first time domain, the second time domain and the third time domain, and eliminating a matrix entry corresponding to the flow having ended or started at the exact time of the second time and the flow having ended at the third time from the legitimate flow to generate a legitimate traffic elimination matrix; a rank value calculator for calculating a rank value of the legitimate traffic elimination matrix; and a network state determiner for determining the network state based on the rank value.

When the worm detecting method and device according to the embodiment of the present invention is used, unknown network worms can be detected with less computational quantity and with further improved accuracy in the earlier stage from the huge network.

Also, when the worm detecting method and device according to the embodiment of the present invention is used, a new and accuracy-improved method for detecting worms based on variation of randomness generated in network traffic without using a pattern-matching-based worm detecting method or a worm-behavior-based worm detecting method.

DETAILED DESCRIPTION OF THE PREFERRED EMBODIMENTS

Figure 1:
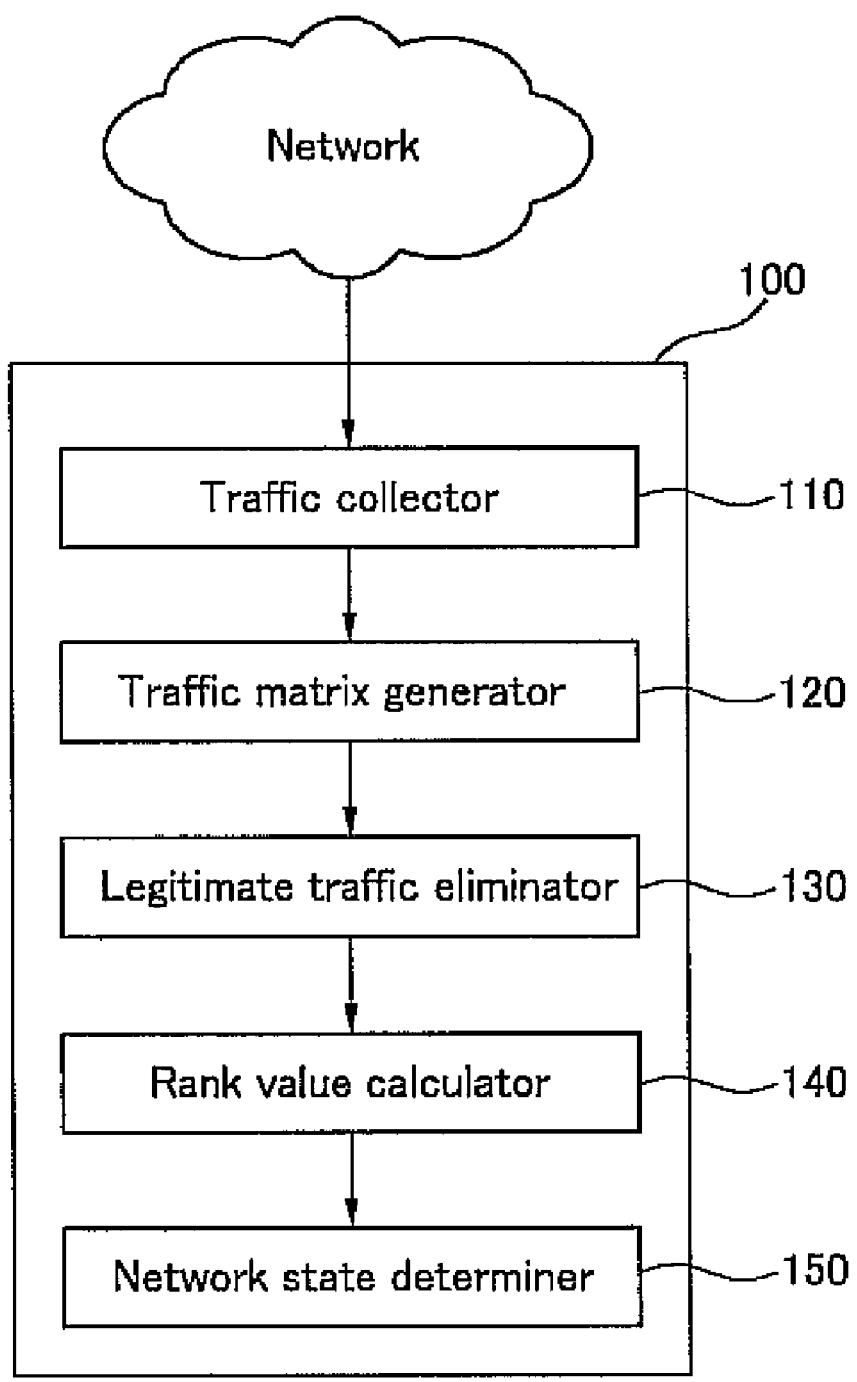
FIG. 1 shows a block diagram of a worm detecting device according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A worm detecting method and device according to exemplary embodiment of the present invention will now be described with reference to accompanying drawings.

I. Configuration of a Worm Detecting Device

FIG. 1 shows a block diagram of a worm detecting device according to an exemplary embodiment of the present invention.

As shown in FIG. 1, the worm detecting device 100 is cooperated with a first network 10, and it includes a traffic collector 110, a traffic matrix generator 120, a legitimate traffic eliminator 130, a rank value calculator 140, and a network state determiner 150.

The constituent elements of the worm detecting device will now be described.

First, the traffic collector 110 collects traffic provided to the network 10.

Next, the traffic matrix generator 120 expresses the characteristic of the traffic collected by the traffic collector 110 in a matrix format. In this instance, the traffic matrix generator 120 determines the element of arranging a corresponding flow (i.e., packet) in the traffic matrix based on a destination Internet Protocol (IP) address of the flow included in the traffic.

The legitimate traffic eliminator 130 eliminates legitimate traffic other than traffic caused by an epidemic of network worms from the traffic matrix.

The rank value calculator 140 measures randomness by calculating a rank value of a legitimate traffic elimination matrix that is acquired by eliminating legitimate traffic by the legitimate traffic eliminator.

Finally, the network state determiner 150 determines the network states of whether the corresponding network is invaded by a network worm based on the rank value calculated by the rank value calculator 140.

A worm detecting method by a worm detecting device according to an exemplary embodiment of the present invention will now be described in further detail.

II. Traffic Matrix Construction by Traffic Matrix Generator

To apply checking of randomness to traffic, traffic is translated into the form of a matrix. Particularly, the IP address is needed to be represented in the matrix as it takes on the randomness in the attack traffic. Further, to catch activity of the network worms, it is needed to view a destination IP address of passing traffic since the worms randomly select targets. Today's network worms use a random number generator to maximize their epidemic speed and simultaneously evade detection.

In designing the traffic matrix construction, it is needed to consider the fact that four octets in an IP address can have separate dynamics depending on a particular strategy employed by the worm in action. The network worms use different scanning strategies. When the octets of an IP address in the traffic in the network are set to be $IP_1$, $IP_2$, $IP_3$, and $IP_4$, the IP address can be expressed as Equation 1.

$$IP = IP_1 \cdot IP_2 \cdot IP_3 \cdot IP_4 \quad \text{[Equation 1]}$$

Figure 2:
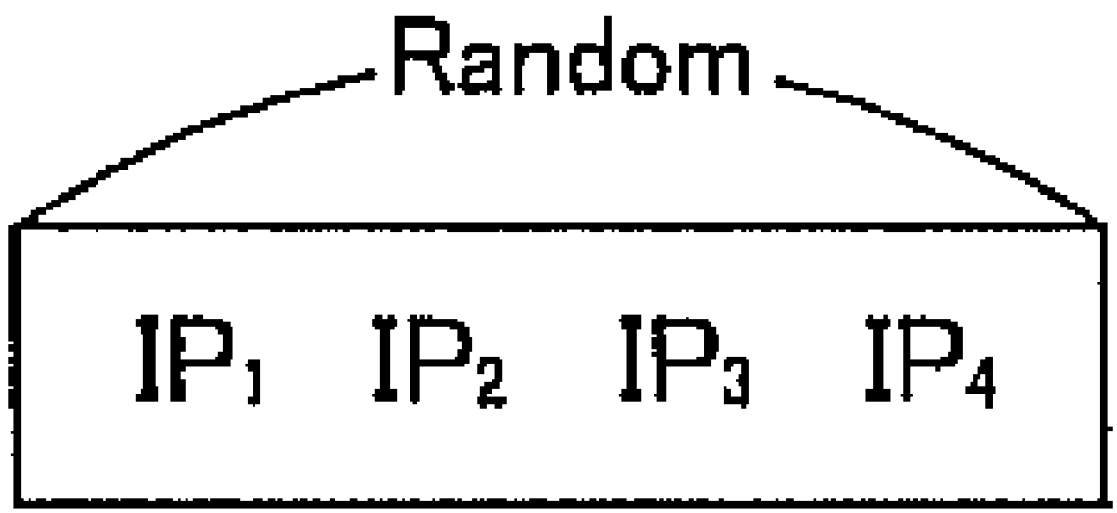
FIG. 2 shows a format of an IP address when a uniform scan is applied.

FIG. 2 shows a format of an IP address when a uniform scan is applied.

The Slammer worm and a Code Red worm use the random scan strategy, which randomly selects four octets $IP_1$ to $IP_4$ of the next target. This strategy is also called a uniform scan.

Figure 3:
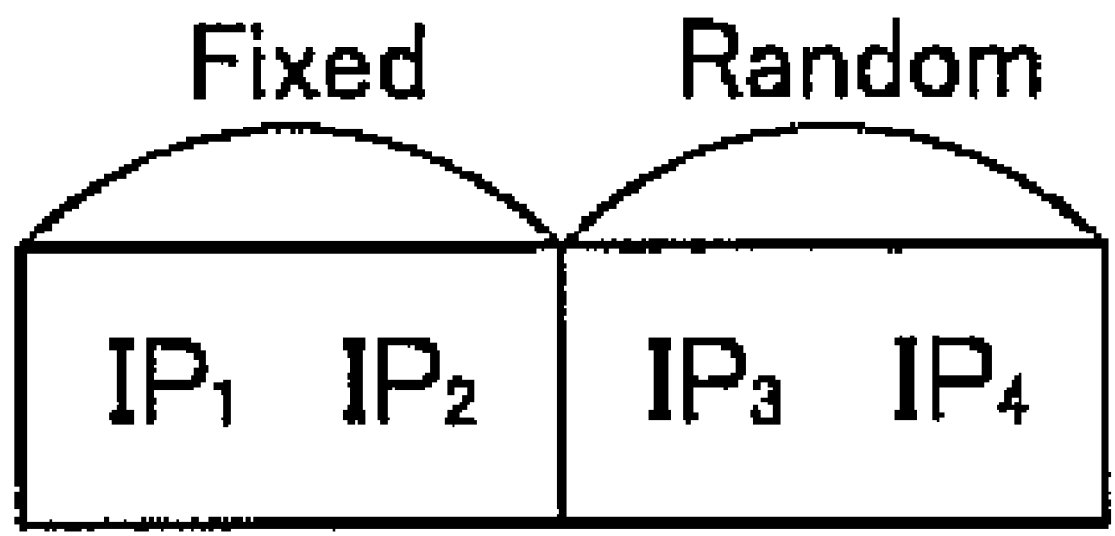
FIG. 3 shows a format of an IP address when a subnet scan is applied.

FIG. 3 shows a format of an IP address when a subnet scan is applied.

The Code Red II, another network worm, uses a scanning strategy with local preferences, which is called a subnet scan. The worm performs the random scan with the probability of ⅛. The worm maintains the same $IP_1$ with the probability of ½, and maintains the same $IP_1 \cdot IP_2$ with the probability of ⅜.

Hence, the scanning strategy of the code red II is fully random in $IP_3$ and $IP_4$, and it is partially random in $IP_1$ and $IP_2$.

Figure 4:
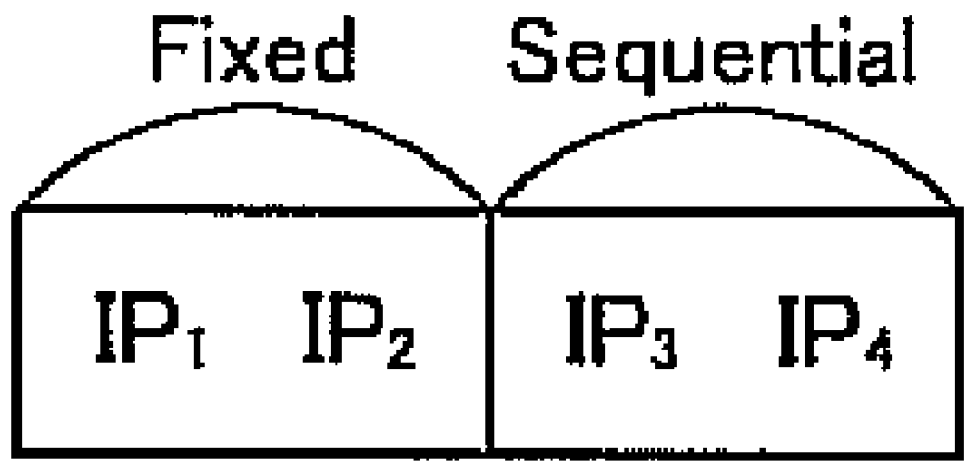
FIG. 4 shows a format of an IP address when a sequential scan is applied.

FIG. 4 shows a format of an IP address when a sequential scan is applied.

The Blaster worm exemplarily uses the sequential scan.

The Blaster worm randomly selects one of $IP_1 \cdot IP_2$, and sequentially scans subsequent target networks within the Class B network until selecting another target network. Therefore, $IP_1$ and $IP_2$ are random, and the distribution of $IP_3$ and $IP_4$ is sequential.

However, from the perspective of the attacked network, the distribution of destination IP address of the scan traffic may not be random but sequential.

For ease of description, the uniform scan and the subnet scan will be referred to as a random scan because they have randomness in predetermined parts of the IP address. The classification of random vs. sequential will be used for the scanning strategies of the network worms given below.

The traffic matrix in the exemplary embodiment of the present invention is a 256×256 matrix, and elements of the traffic matrix respectively have 1 bit.

When the traffic matrix is a relatively large 256×256 binary matrix, the computer requires only a small memory space of 8 Kbyte to process the traffic matrix.

The 256×256 traffic matrix can represent 65,536 distinct destination IP addresses at maximum. In this instance, in order to maintain the randomness in the IP address used by the worm, the destination IP address of each flow included in the corresponding traffic is to be mapped on the element of the traffic matrix.

When i and j are given as a row index and a column index respectively, a corresponding relationship between the destination IP address of each flow included in the traffic and the traffic matrix is expressed in Equation 2.

$$i = IP_1 \oplus IP_3, j = IP_2 \oplus IP_4,$$ [Equation 2]

where $\oplus$ denotes a bitwise exclusive OR (XOR) operation.

High randomness is maintained in the scanning strategies adopted by the network worms.

In the case of sequential scan worms, the mapping function performs a permutation due to the XOR, and once the mapping selects each row (XOR'ed IP3), it fills the row with 1's in the permuted order (XOR'ed IP4). Resultantly, the corresponding row has entries of 1, and the worm's scan traffic is increased as time is passed so that the number of rows having the entries of 1 is sequentially increased. Since the rows reach 0 according to the Gaussian elimination performed by the rank value calculator, the rank value is steeply reduced so that the rank value approaches 0.

In the case of random scan worms, randomness is maintained since random entries are increased to the traffic matrix.

When the random scan worm and the sequential scan worm are generated together, the rank value is extremely reduced to be near 0 in a like manner of the sequential scan worm. The traffic matrix generator 120 for generating the traffic matrix allows overwriting when the mapping function writes the entry of the traffic matrix to generate the same result as the case in which the rank value caused by the sequential scan worm extremely approaches 0 since the traffic caused by the sequential scan is written on the matrix as the number of hosts infected by worms is increased.

Once the mapping is defined, the traffic matrix is easily constructed by the traffic matrix generator 120 of the worm detecting device 100.

When the unit period starts, the traffic matrix is filled with 0's. The entries corresponding to the respective destination IP addresses in the passing flow (packet) are overwritten with the value 1. The matrix continues to be filled with 1's until the unit period is finished.

In this instance, the duration of the unit period depends on the working environments, and typical values are on the order of seconds including 1 second and 10 seconds. The unit period is set to be 1 second in the exemplary embodiment of the present invention, which is based on the point that the duration of an illegitimate flow caused by infection by network worms is generally less than 1 second and the duration of a normal flow is generally greater than 1 second.

III. Traffic Filtering Matrix Operations

When the traffic matrix construction is finished for the unit period, the legitimate traffic eliminator 130 of the worm detecting device 100 attempts to improve accuracy of attack detection by eliminating the legitimate flow in the traffic.

The legitimate traffic eliminator 130 filters legitimate traffic by performing a subsequent operation on the traffic matrix.

Particularly, the legitimate traffic eliminator 130 performs a bitwise XOR operation on two traffic matrices from consecutive time units to eliminate most of legitimate flow existing in the two consecutive traffic matrices, and controls the suspicious traffic to remains in the result matrix. Also, the legitimate traffic eliminator 130 performs a bitwise AND operation on two consecutive matrices for long-lived legitimate traffic.

The present inventor has a patent (registered number: 745613, and title: Network Monitoring Device and Program Storing Recording Medium) for detecting unknown network worms from a huge network with less computational quantity in the earlier stage.

According to the patent, detailed states of the network are checked by using rank values of the traffic matrix to which characteristics of inflow traffic and outflow traffic are applied through the network. That is, when the rank value of the traffic matrix is greater than a predetermined normal range, it is determined that it is attacked by the network worms, and hence, the attacks of the worms are found and processed in the earlier stage.

The worm detecting method according to the existing invention could detect a network attack by a worm with substantial accuracy.

However, in the existing invention by the present applicant, when a legitimate flow begins concurrently at a start time (i.e., time t−1) of a predetermined time frame with the start time of t−1 and the end time of t, or it finishes at the end time (i.e., time t), it cannot be eliminated from the matrix.

Therefore, in the worm detecting device 100 according to the embodiment of the present invention, the legitimate traffic eliminator 130 increases worm detecting accuracy by applying a new filtering mechanism for removing the flow that cannot be removed by the existing invention from among the legitimate flow while performing a filtering process for removing the legitimate flow.

Figure 5:
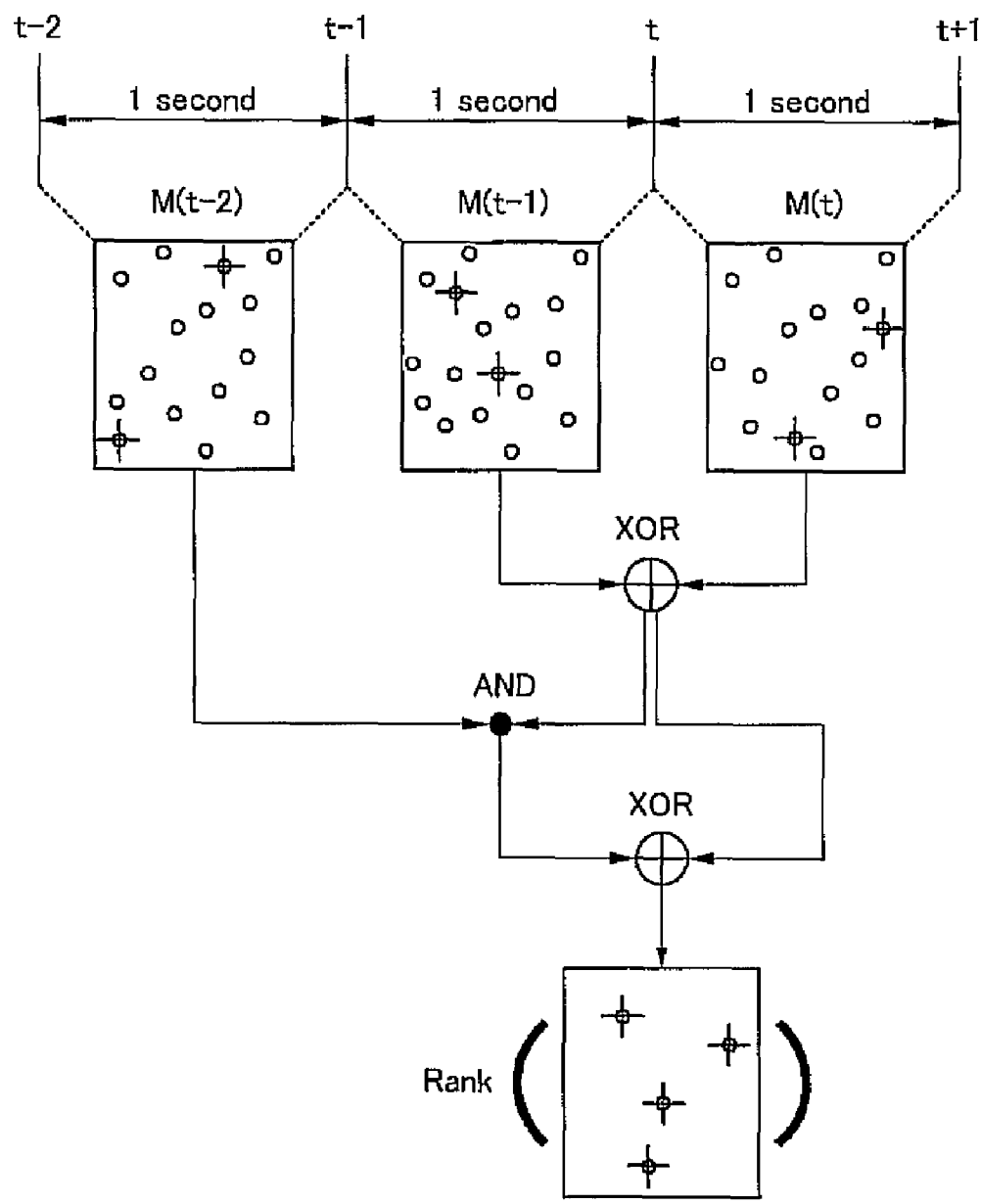
FIG. 5 shows a mechanism of filtering and rank value measurement used in a worm detecting method according to an exemplary embodiment of the present invention.

FIG. 5 shows a mechanism of filtering and rank value measurement used in a worm detecting method according to an exemplary embodiment of the present invention.

M(t) will be defined to be a traffic matrix that is constructed with traffic that is collected during the time domain from a time t to a time t+1.

Here, M(t−1) represents a traffic matrix corresponding to traffic collected in the time domain between t−1 and t, and likely, M(t−2) represents a traffic matrix corresponding to traffic collected in the time domain between t−2 and t−1.

Further, M(t)⊕M(t−1) indicates a matrix when an XOR operation is performed on the corresponding entries in M(t) and M(t−1).

The XOR operation is used to remove the overlapped entries, which are not malicious in a general manner. For example, when there are 4 legitimate flows and 1 packet is generated per time unit by a worm, the XOR operation on the simplified 4×4 matrix will generate a filtering result as expressed in Equation 3.

$$\begin{pmatrix} 0 & 0 & 1 & 0 \\ 1 & 0 & 0 & 1 \\ 0 & 1 & 0 & 0 \\ 1 & 0 & 0 & 0 \end{pmatrix} \oplus \begin{pmatrix} 0 & 0 & 1 & 0 \\ 0 & 0 & 0 & 1 \\ 0 & 1 & 1 & 0 \\ 1 & 0 & 0 & 0 \end{pmatrix} = \begin{pmatrix} 0 & 0 & 0 & 0 \\ 1 & 0 & 0 & 0 \\ 0 & 0 & 1 & 0 \\ 0 & 0 & 0 & 0 \end{pmatrix}$$ [Equation 3]

That is, as can be known from Equation 3, since the legitimate flow has a duration time that is greater than 1 second, it is shown as 1 at the same position in the two matrices in the adjacent time domain. Therefore, the component of 1 generated as the result of performing the XOR operation can be considered as an illegitimate packet that is generated by epidemic of network worms.

In the case of a normal network, the rank value of the matrix M(t)⊕M(t−1) becomes less than that of M(t) unless there is a surge of new legitimate flows to the network at the time of t.

Further, the rank value of the matrix M(t)⊕M(t−1) will be greater than that of M(t) when the random scan traffic is increased by an epidemic of network worms through the network.

After the XOR operation is performed to remove most of the legitimate flow in the corresponding time domain, some legitimate flow will leave traces in the traffic matrix.

For example, it will include a flow that newly starts or terminates at a specific time for identifying time domains.

In order to exclude the flow, in the exemplary embodiment of the present invention, the legitimate traffic eliminator 130 performs a matrix operation expressed in Equation 4 to more efficiently eliminate the legitimate flow.

$$M'(t) = M_{XOR}(t) \oplus (M_{XOR}(t) \cdot M(t-2))$$ [Equation 4]

In Equation 4, M'(t) will be referred to as a legitimate traffic elimination matrix.

Here, $M_{XOR}(t)$ represents an XOR operation by the two consecutive matrices, as expressed in Equation 5.

$$M_{XOR}(t) = M(t) \oplus M(t-1)$$ [Equation 5]

When a legitimate traffic is finished at the time of t−1 or t, die corresponding traffic may be included in $(M_{XOR}(t) \cdot M(t-2))$ and it is removed from M'(t).

In FIG. 5, the circular point represents legitimate traffic, and the cross symbol indicates illegitimate traffic generated by the worm having attacked the network.

As shown on the bottom of FIG. 5, the legitimate traffic elimination matrix that is a traffic matrix after the filtering process according to the exemplary embodiment of the present invention has an illegitimate flow. The legitimate traffic elimination matrix is used to measure the rank value for the subsequent corresponding time frame.

Figure 6:
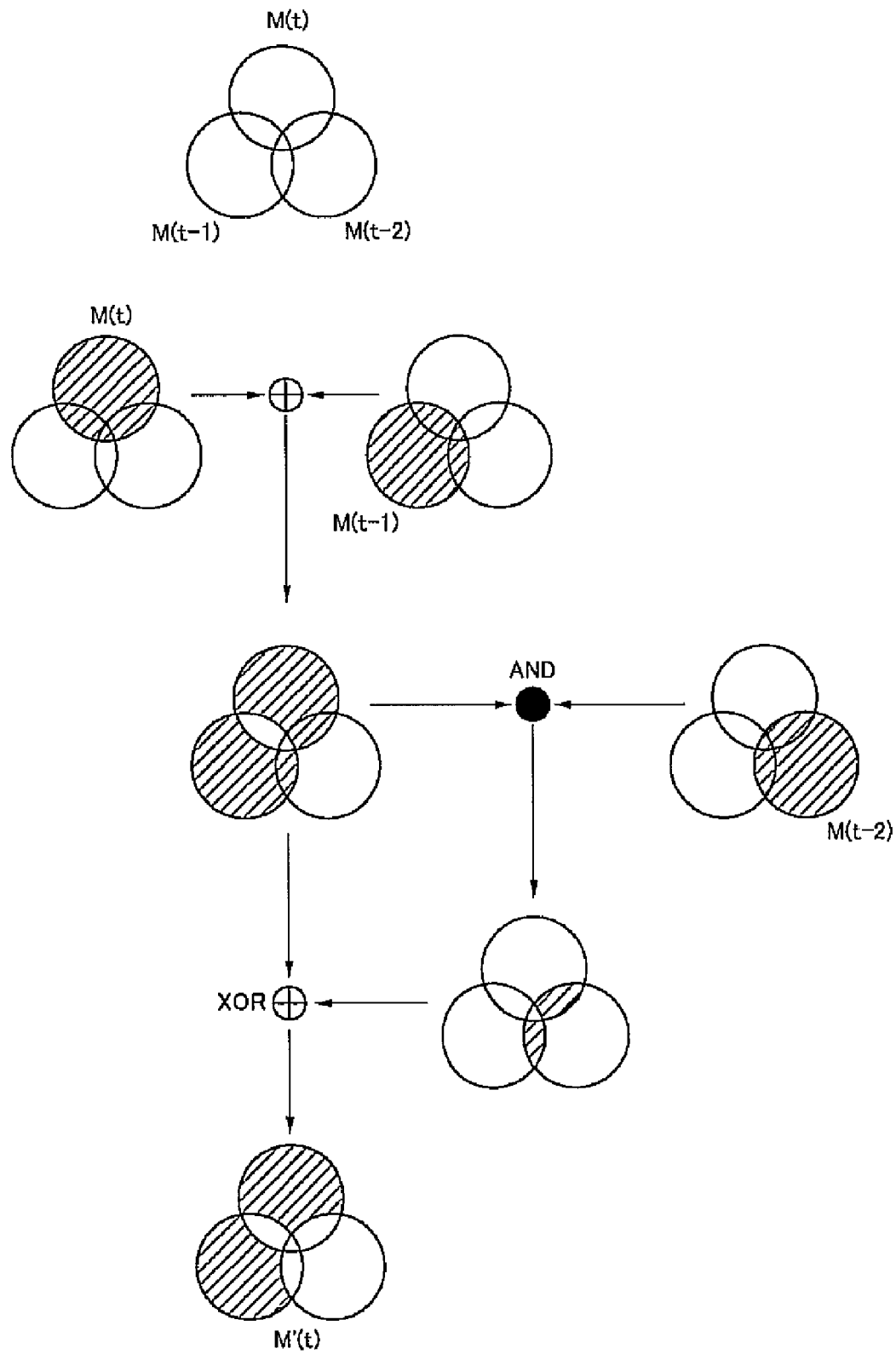
FIG. 6 shows a Venn diagram representing a principle of filtering and a relationship of traffic matrices according to an exemplary embodiment of the present invention.

FIG. 6 shows a Venn diagram representing a principle of filtering and a relationship of traffic matrices according to an exemplary embodiment of the present invention.

In FIG. 6, starting connections at the time of t may or may not be legitimate, which cannot be determined until the time reaches t+1, and hence, the flow cannot be eliminated at M'(t). Also, it can be checked that the flows at the exact times of t−1 and t that can be legitimate flows very probably are eliminated.

IV. Rank Value Measurement

The rank value calculator 140 measures randomness by calculating the rank value of the legitimate traffic elimination matrix which is acquired by eliminating legitimate traffic by the legitimate traffic eliminator.

The rank value of the random m×n binary matrix has the probability of the following Equation 6.

$$P = 2^{r(n+m-r)-nm} \prod_{i=0}^{r-1} \frac{(1 - 2^{i-n})(1 - 2^{i-m})}{(1 - 2^{i-r})}$$ [Equation 6]

where $r = 1, 2, \ldots, \min(m, n)$

When the rank value is calculated by applying the $\log_2$ function of Equation 6, Equation 7 is obtained as follows.

$$(m - r)^2 > \log_2 \frac{1}{P}$$ [Equation 7]

$$(m - r)^2 > \log_2 \frac{1}{P}$$

That is, assuming that the probability P is 0.001% (i.e., a value near 0), the greatest rank value will be 252 in the 256×256 binary matrix.

In other words, a reference value becomes the maximum rank value for a specific probability P in which the legitimate traffic elimination matrix will not be a random matrix.

For example, when a 256×256 binary matrix has a rank value greater than 252, it is known that the matrix has a rank value greater than 252 with the probability of 99.999%.

Hence, when the rank value of the legitimate traffic elimination matrix calculated by the rank value calculator 140 exceeds a predetermined value, for example, when the rank value is greater than 252 in the 256×256 matrix, the network state determiner 150 of the worm detecting device 100 determines the network state as one in which the corresponding network starts being attacked by the network worm.

V. Network Worm Detecting Method

A case in which a random scan type of worm from among the network worms attacks the network will now be exemplified. Also, it is assumed that the epidemic volume of the worm is equal to that of the Slammer worm.

Here, N is a vulnerable population size for a specific worm, L is a monitoring network size (with reference to the number of IP addresses), and α is an infection ratio. Accordingly, αN represents the number of infected hosts in the vulnerable population. Also, the worm scan rate β indicates the number of scans per second per worm.

For the simulation, it is set that $N=10^6$, $β=3 \times 10^2$, $6 \times 10^2$, $10^3$, and $L=2^{16}$. For reference, the value β is appropriate considering that the scan rate of the slammer worm is 26,000 scans/second at maximum, approximately 4000 scans/second per worm on average, and the slow scan rate performed by one of anomalies of the past code red II worms for escaping detection is 300 scans/second. Also, the value of β is set to have three kinds of values ($3 \times 10^2$, $6 \times 10^2$ and $10^3$) in order to show that the current invention is also available for early detecting of worms of slow scanning.

Figure 7:
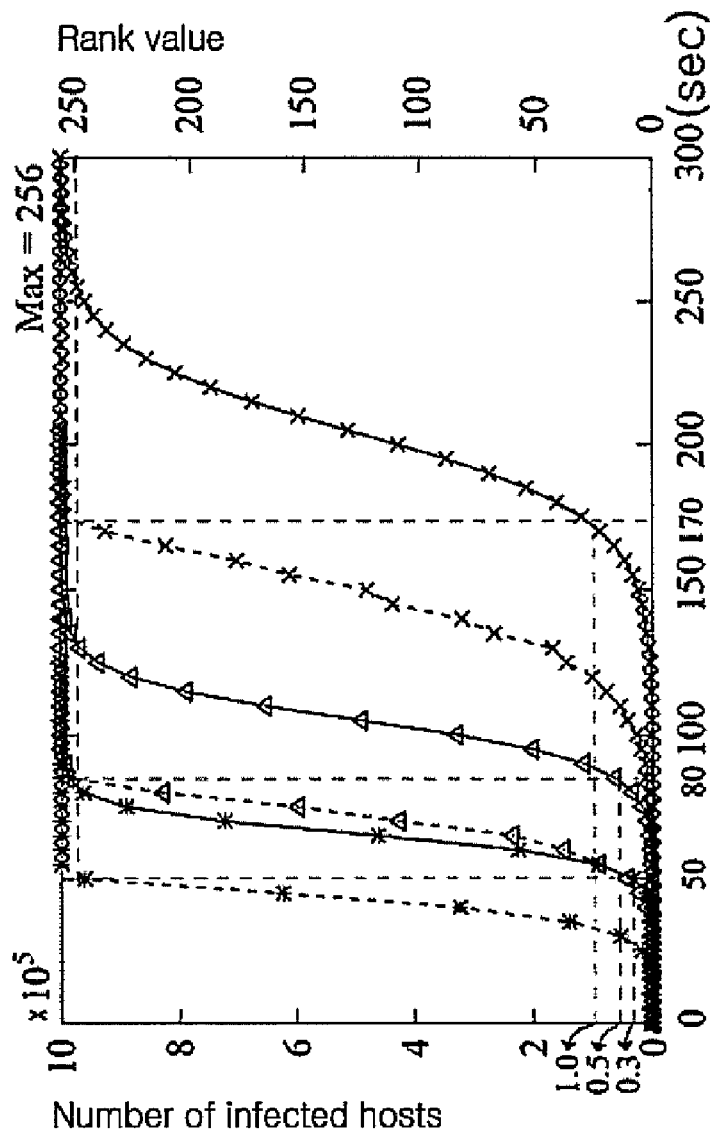
FIG. 7 shows a graph representing a simulation result with a number of infected hosts and rank values.

FIG. 7 shows a graph representing a simulation result with a number of infected hosts and rank values.

As shown in FIG. 7, as the number of infected hosts is increased, the rank value of the legitimate traffic elimination matrix according to the exemplary embodiment of the present invention is steeply increased within a short time. In the case in which the scan rate by the worm is 1000 scans/second, when only 3% of vulnerable hosts are infected on the entire network, the rank value approaches the maximum value of 256 exceeding the value of 252. That is, the rank value over 252 is acquired when α=0.03 in the case of $N=10^6$, $β=10^3$, and $L=2^{16}$. Also, in the case in which the scan rates are 600 scans/second and 300 scans/second, when 5% and 10% of the vulnerable hosts are infected on the entire network, the rank value approaches the maximum value of 256 exceeding the value of 252. That is, the rank value over 252 is acquired when α=0.05 and 0.1 and $β=6 \times 10^2$ and $3 \times 10^2$ in the case of $N=10^6$ and $L=2^{16}$.

In the simulation of FIG. 7, the time when the rank value steeply increases advances the time when the number of hosts infected by the worm steeply increases by substantially 30 seconds.

In today's world of all automated attacks, human-intervened countermeasures are becoming too slow to stop the epidemic. For example, the Slammer worm grows to a full epidemic within 10 minutes in the internet. However, according to the worm detecting method according to the exemplary embodiment of the present invention, the worm's attack can be predicted about several tens of seconds in advance by only sensing the steep change of the rank value.

With the help of the several tens of seconds acquired by the present invention, a necessary measure for preventing worm epidemic or epidemic speed delay can be applied.

Figure 8:
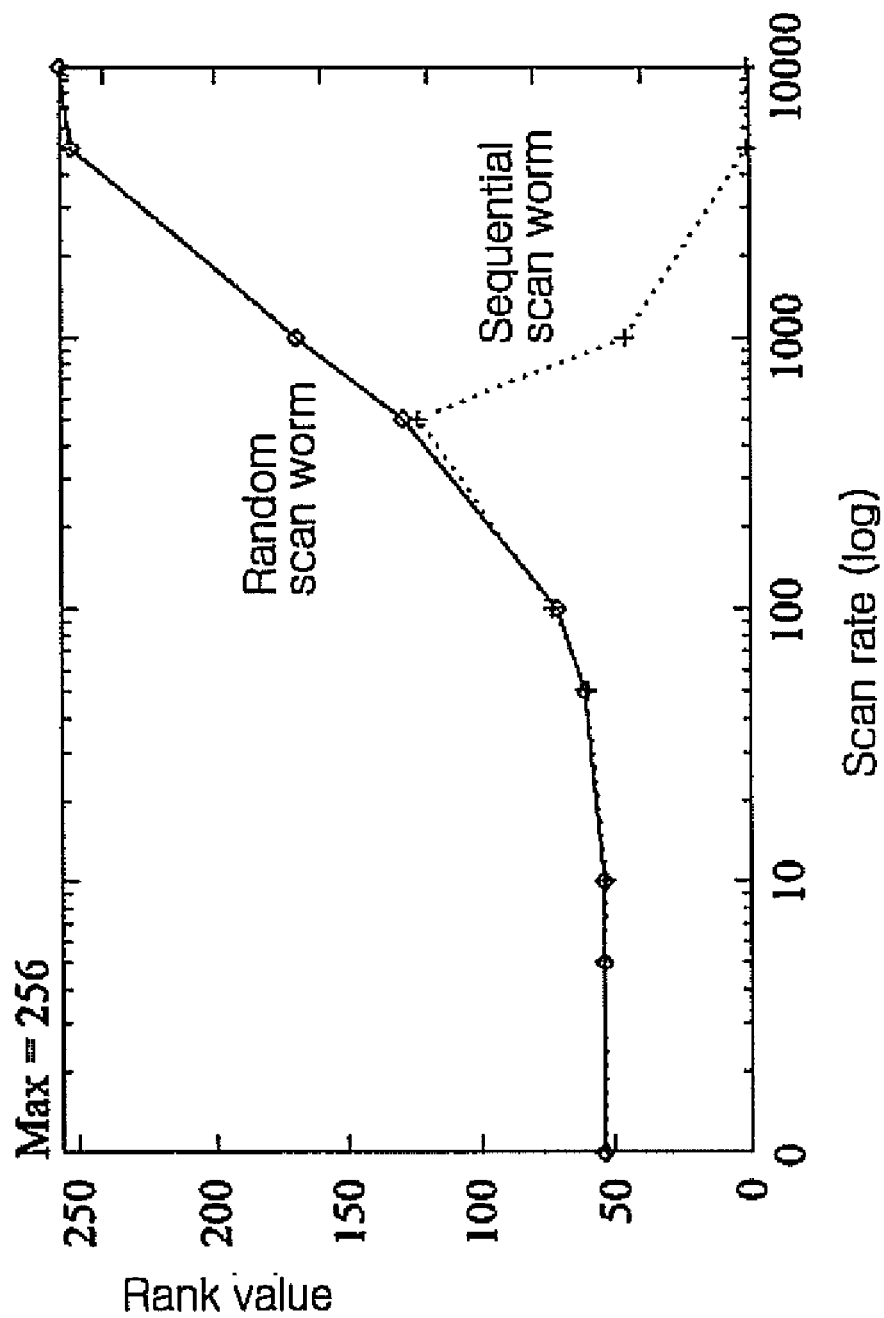
FIG. 8 shows a graph indicating rank values of two kinds of worms as a function of scan rate $\beta$ in a 256×256 traffic matrix.

FIG. 8 shows a graph indicating rank values of two kinds of worms as a function of scan rate β in a 256×256 traffic matrix.

Figure 9:
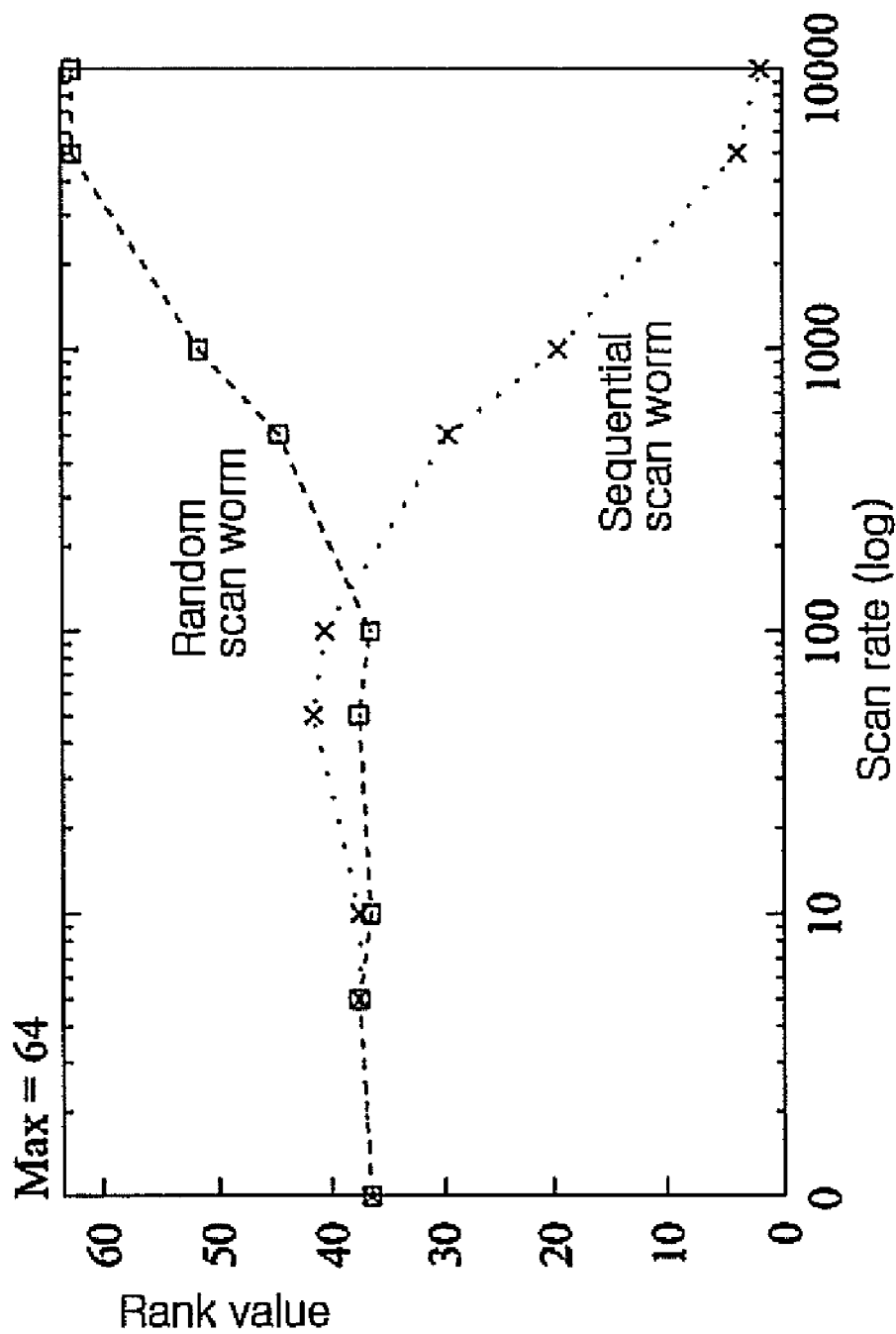
FIG. 9 shows a graph indicating rank values of two kinds of worms as a function of scan rate β in a 64×64 traffic matrix.

FIG. 9 shows a graph indicating rank values of two kinds of worms as a function of scan rate β in a 64×64 traffic matrix.

As shown in FIG. 8 and FIG. 9, the 2 kinds of worms are respectively a random scan worm and a sequential scan worm.

Simulations of FIG. 8 and FIG. 9 are performed by the method in which network worms (random scan worm and sequential scan worm) are actually injected to the /16 university campus network and they are tracked by the gateway of the network. Also, the rank value in this instance is measured for the case in which 10,000 hosts are infected ($\alpha=0.01$).

As can be known in common from FIG. 8 and FIG. 9, the rank value of the random scan worm has dramatically increased as the scan rate increases.

On the other hand, the rank value of the sequential scan worm suddenly reduces after $\beta=1000$.

The above-noted characteristics allows a non-uniform scan worm such as Blaster to be detected by monitoring the single block of the IP address space, whereas previous worm monitoring method approaches are effective when their monitoring address space is largely distributed.

That is, as the worm activity intensifies, it drives the matrix rank value to be extremely high or extremely low, which is a clear indication. Differing from this, when the network is normal and the worm activity does not become stronger, the rank value hovers at non-extreme values as time passes.

Figure 10:
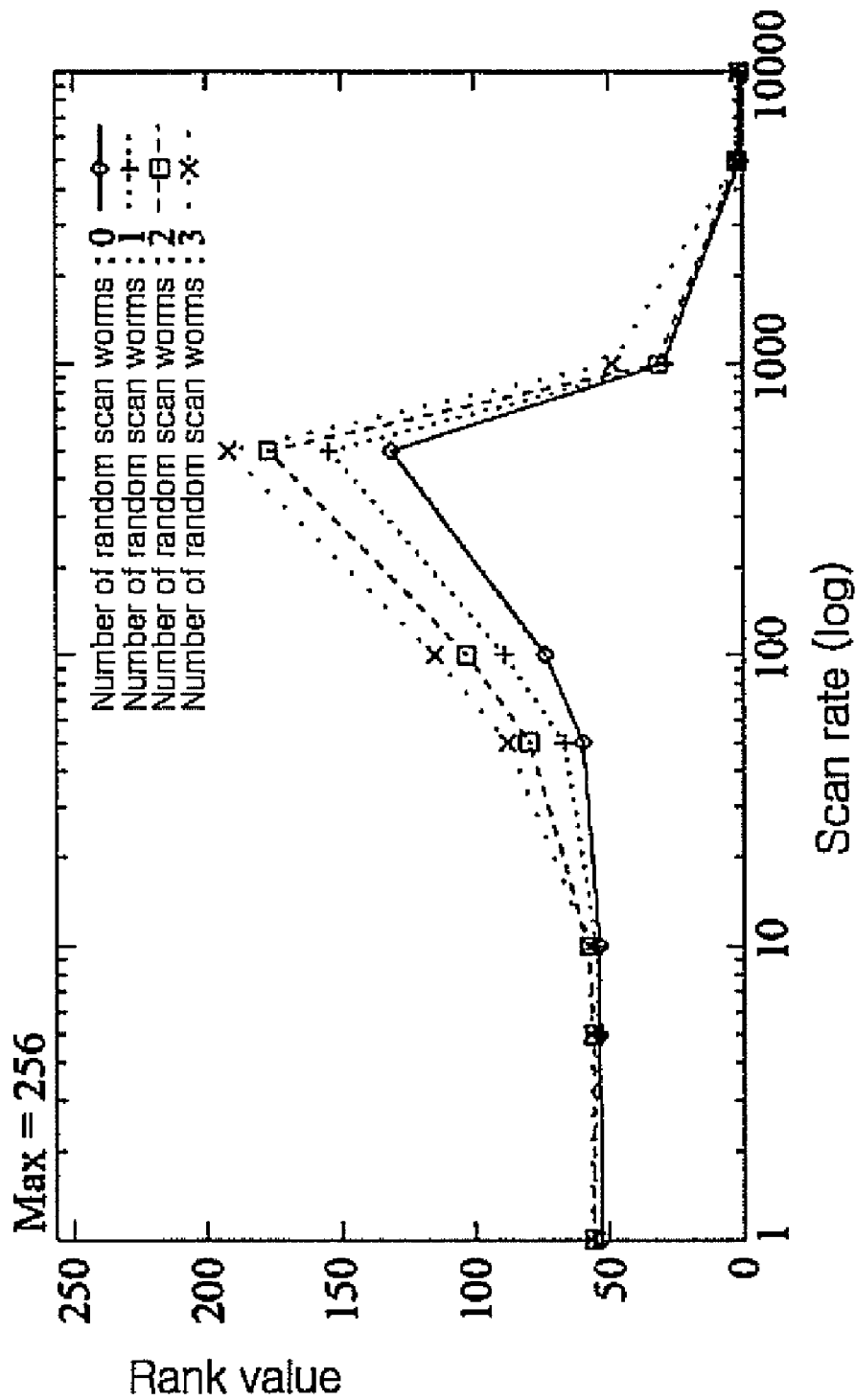
FIG. 10 shows a graph in which the rank value approaches 0 when the number of random scanning worms is sequentially increased in the order of 0, 1, 2, and 3 under the condition in which one sequential scanning worm is propagated on the network.

FIG. 10 shows that the rank value dramatically approaches 0 if one scanning worm is mixed even if the number of sequential scan worms is increased, which includes two cases. The first case is a case in which many worms having various mixed scans are spread concurrently on the network, and the second case shows that when the sequential scanning is also used even though an escaping method such as a method for performing scanning while intermittently mixing sequential scanning traffic is used so as to deceive the characteristic of the random scanning behavior, the worm epidemic can be detected according to detection caused by sequential scanning. This is a result caused by the Gaussian elimination for calculating the rank value. In order to calculate the rank value through Gaussian elimination, the XOR operation is performed on the rows of the matrix because the matrix for calculating the rank value by the present skill is a binary matrix. Therefore, when the sequential scanning worm is propagated, the rows with the entries of 1 in the matrix are repeatedly and sequentially provided, which is generated because of all become 0 by Gaussian elimination.

The above-noted result generates the result shown in Equation 8. Equation 8 exemplifies a 4×4 matrix so as to check the fact that matrices with all entries of 1 are changed into 0 by Gaussian elimination. When all the entries sequentially have 0 from the first row to the third row by the sequential scanning worm, one row such as the right matrix and other rows are changed into rows having 0's by the XOR operation according to the Gaussian elimination for solving the rank value. The rank value is dramatically reduced to be near 0 when the sequential scanning worm is spread by the effect of the Gaussian elimination.

$$\begin{pmatrix} 1 & 1 & 1 & 1 \\ 1 & 1 & 1 & 1 \\ 1 & 1 & 1 & 1 \\ 0 & 0 & 1 & 0 \end{pmatrix} \Rightarrow \begin{pmatrix} 1 & 1 & 1 & 1 \\ 0 & 0 & 0 & 0 \\ 0 & 0 & 0 & 0 \\ 0 & 0 & 1 & 0 \end{pmatrix} \qquad \text{[Equation 8]}$$

VI. Determination of Number of Scanning Packets

When the rank value is increased to exceed a threshold value such as 252, the number of scanning packets to be collected to the traffic matrix so as to be on the alert for imminent onset of a worm epidemic can be produced from subsequent calculation.

γ is defined to be a random factor, and a random binary matrix with an extremely high rank value is filled with $\gamma m^2$-numbered 1's.

In this instance, in order for a random scanning worm to randomly change the entries written as 0 in the traffic matrix to a sufficient number of 1's $\gamma m^2$ scanning packets are needed.

However, the required number of random scanning packets is less than $\gamma m^2$.

This is because, as described above, the non-zero entries in M'(t) are approximately doubled after eliminating the legitimate traffic from the traffic matrix (e.g., M(t)⊕M(t−1) operation).

Therefore, the random m×m matrix can be built with half the $\gamma m^2$.

Hence, the number of scanning packets to be collected for warning onset of worm epidemic can be expressed as Equation 9.

$$\alpha N \cdot \beta \cdot L / 2^{32} \geq \gamma \cdot m^2 / 2 \qquad \text{[Equation 9]}$$

The parameters N, β, α, and L are determined independently from the state of whether the result matrix M'(t) is random or not. That is, the parameters N and L are determined by host and network configurations, β is determined by a worm attribute, and m is determined by an anomaly detecting module configuration. Also, the parameter γ is a property of matrix randomness and is determined by m.

Table 1 shows a random factor traffic matrix relationship.

TABLE 1

| | m | | | | | |
|---|---|---|---|---|---|---|
| | 32 | 64 | 128 | 256 | 512 | 1024 |
| γ | 0.063 | 0.041 | 0.025 | 0.014 | 0.008 | 0.005 |

The average random factor γ can be experimentally measured through iterations of random matrix construction, which is shown in Table 1.

When a small fraction of the traffic matrix region is activated by the random scan packet, randomness can be detected through the rank value of the legitimate traffic elimination matrix according to the worm detecting method of the embodiment of the present invention.

Further, Table 1 can be considered from the viewpoint of sensitivity of the rank metric when it is used for randomness detection.

Interplay among the parameters can be well understood according to Equation 9.

That is, the worm epidemic can be detected in the earlier stage by increasing the worm scan rate β while the infection ratio α is low.

Figure 11:
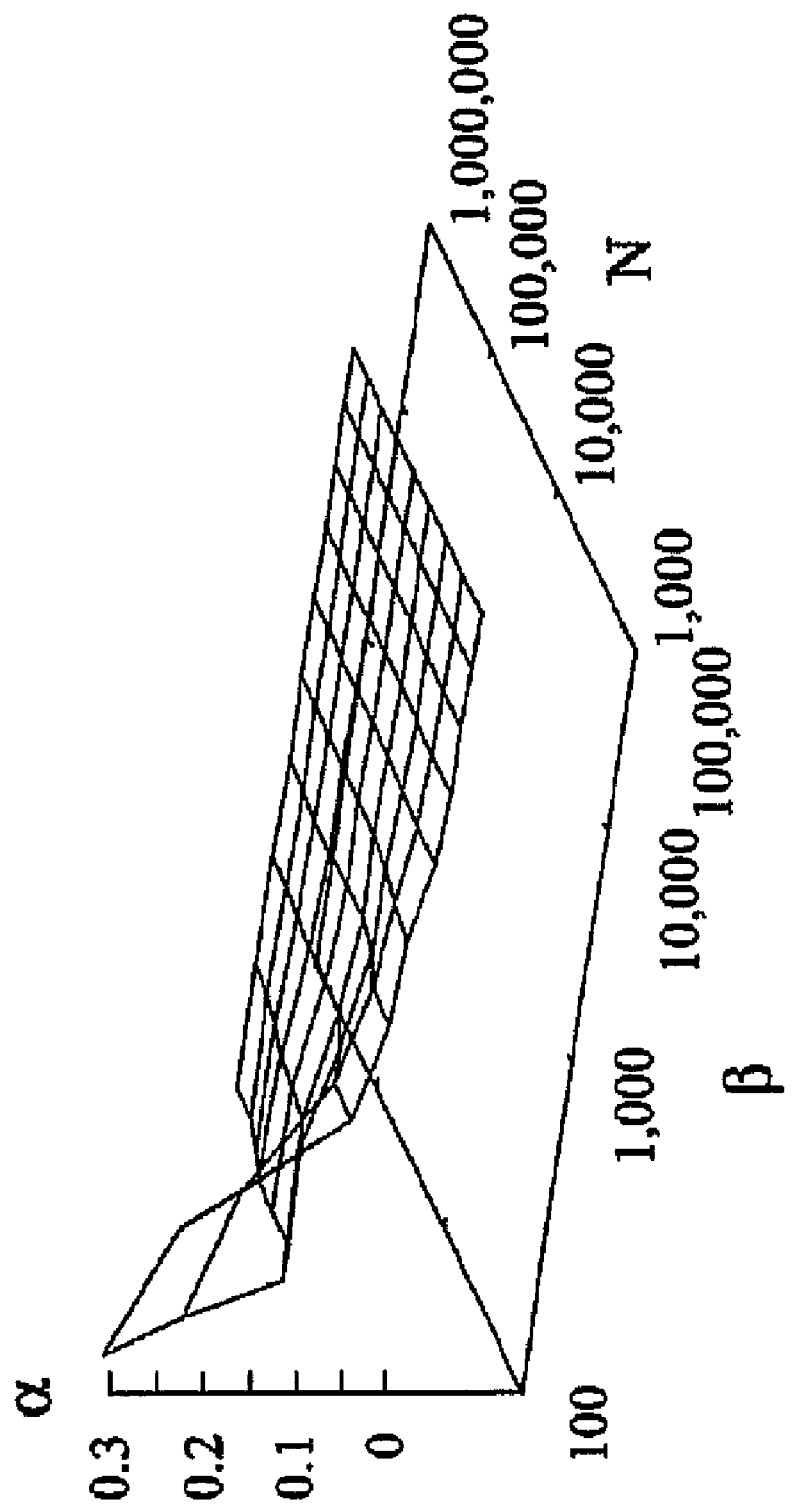
FIG. 11 shows a graph showing a relationship among an infection ratio, a worm scan rate, and host population size used for detecting an epidemic of worms through a change of rank values of a legitimate traffic elimination matrix.

For example, the worm scan rate β is given as 1000 when the infection ratio α is 0.03 in the simulation shown in FIG. 11, and the infection ratio α is reduced to 0.01 when the worm scan rate β is increased to 3000 in the same condition. That is, the worm can be detected when the infection ratio is further low (i.e., the worm is less spread in the network).

The inverse proportionality between α and β shown in Equation 9 realizes faster worm detection by increasing the scan rate for the worm with faster epidemic speed by the worm detecting method according to the exemplary embodiment of the present invention.

FIG. 11 shows a graph showing a relationship among an infection ratio, a worm scan rate, and host population size used for detecting an epidemic of worms through a change of rank values of a legitimate traffic elimination matrix.

For example, when the vulnerable host population size N is $10^5$ to $10^6$ and the worm scan rate β is 5000 to 10,000, the infection ratio α of the host in the network by the detected worm is 0.3% to 1.2%, which can be checked by the graph of FIG. 11.

That is, when the worm detecting method according to the embodiment of the present invention is used for the parameter range of a global worm epidemic, the network worm having attacked the network can be detected at the early time such that sufficient time for processing the worm epidemic can be obtained.

As described above, the matrix is a convenient data structure with well-defined power operations in applying various operations for detecting the worms attacking through the network in the earlier stage. According to the present invention, the state of whether the worm has attacked the network can be easily determined according to the rank value size by constructing a traffic matrix from network traffic as a matrix based attack detecting mechanism and measuring the rank value after filtering the legitimate traffic.

Further, the matrix approach according to the embodiment of the present invention is applicable not only for detecting network worms but also for other types of attacks for increasing randomness in the network traffic.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A worm detecting method comprising the step of:
    collecting, by a worm detecting device, traffic provided to a network to thus collect passing traffic;
    generating, by the worm detecting device, a first traffic matrix for showing a characteristic of the traffic in a first time domain beginning at a first time, a second traffic matrix for showing a characteristic of the traffic in a second time domain beginning at a second time that is an end time of the first time domain, and a third traffic matrix for showing a characteristic of the traffic in a third time domain beginning at a third time that is an end time of the second time domain to thus generate a traffic matrix;
    eliminating by the worm detecting device, a matrix entry corresponding to a legitimate flow in the first time domain, the second time domain and the third time domain, and eliminating a matrix entry corresponding to the flow having ended or started at the exact time of the second time and the flow having ended at the third time from the legitimate flow, and generating a legitimate traffic elimination matrix to thus eliminate legitimate traffic;
    calculating by the worm detecting device, a rank value of the legitimate traffic elimination matrix to thus calculate a rank value; and
    determining by the worm detecting device the network state based on the rank value to thus determine a state of the network.

2. The worm detecting method of claim 1, wherein the elimination of legitimate traffic further includes:
    performing an XOR operation on the second traffic matrix and the third traffic matrix to acquire a first matrix; and
    performing an AND operation on the first matrix and the first traffic matrix to acquire a second matrix, wherein the legitimate traffic elimination matrix is generated by performing an XOR operation on the first matrix and the second matrix.

3. The worm detecting method of claim 1, wherein in the generation of a traffic matrix, when a specific flow is collected in the collection of traffic, a matrix entry corresponding to an IP address of the flow of the first traffic matrix, the second traffic matrix, and the third traffic matrix is changed from 0 to 1.

4. The worm detecting method of claim 1, wherein, in the calculation of a rank value, the rank value is a number of rows other than 0 generated by applying Gaussian elimination to the legitimate traffic elimination matrix.

5. The worm detecting method of claim 4, wherein, in the calculation of a rank value, when the rank value is r, the probability in which the legitimate traffic elimination matrix is not a random matrix is P, and the sizes of a row and a column of the legitimate traffic elimination matrix are m and n respectively, the rank value is expressed as $$P = 2^{r(n+m-r)-nm} \prod_{i=0}^{r-1} \frac{(1-2^{i-n})(1-2^{i-m})}{(1-2^{i-r})}.$$

6. The worm detecting method of claim 1, wherein, in the determination of a network state, when the rank value is greater than a predetermined reference value, the network is determined to be infected by a worm.

7. The worm detecting method of claim 1, wherein, in the determination of a network state, when the rank value is dramatically reduced to approach 0, the network is determined to be infected by a worm.

8. The worm detecting method of claim 6, wherein the reference value is the maximum rank value for a specific probability in which the legitimate traffic elimination matrix is not a random matrix.

9. A worm detecting device comprising:
    a traffic collector for collecting traffic provided to a network;
    a traffic matrix generator for generating a first traffic matrix for showing a characteristic of the traffic in a first time domain beginning at a first time, a second traffic matrix for showing a characteristic of the traffic in a second time domain beginning at a second time that is an end time of the first time domain, and a third traffic matrix for showing a characteristic of the traffic in a third time domain beginning at a third time that is an end time of the second time domain;
    a legitimate traffic eliminator for eliminating a matrix entry corresponding to a legitimate flow in the first time domain, the second time domain and the third time domain, and eliminating a matrix entry corresponding to the flow having ended or started at the exact time of the second time and the flow having ended at the third time from the legitimate flow to generate a legitimate traffic elimination matrix;

a rank value calculator for calculating a rank value of the legitimate traffic elimination matrix; and a network state determiner for determining the network state based on the rank value.

10. The worm detecting device of claim 9, wherein the legitimate traffic eliminator performs an XOR operation on the second traffic matrix and the third traffic matrix to acquire a first matrix and performs an AND operation on the first matrix and the first traffic matrix to acquire a second matrix, and performs an XOR operation on the first matrix and the second matrix to generate the legitimate traffic elimination matrix.

11. The worm detecting device of claim 9, wherein the traffic matrix generator changes a matrix entry corresponding to an IP address of the flow of the first traffic matrix, the second traffic matrix, and the third traffic matrix from 0 to 1 when a specific flow is collected in the collection of traffic.

12. The worm detecting device of claim 9, wherein the rank value calculator calculates a number of rows other than 0 generated by applying Gaussian elimination to the legitimate traffic elimination matrix as the rank value.

13. The worm detecting device of claim 12, wherein when the rank value is r, the probability in which the legitimate traffic elimination matrix is not a random matrix is P, and the sizes of a row and a column of the legitimate traffic elimination matrix are m and n respectively, the rank value calculator generates the rank value according to the subsequent equation:

$$P = 2^{r(n+m-r)-nm} \prod_{i=0}^{r-1} \frac{(1-2^{i-n})(1-2^{i-m})}{(1-2^{i-r})}.$$

14. The worm detecting device of claim 9, wherein the network state determiner determines that the network is infected by a worm when the rank value is greater than a predetermined reference value.

15. The worm detecting device of claim 9, wherein the network state determiner determines that the network is infected by a worm when the rank value is dramatically reduced to approach 0.

16. The worm detecting device of claim 14, wherein the reference value is the maximum rank value for a specific probability in which the legitimate traffic elimination matrix is not a random matrix.

* * * * *